Aug. 3, 1948.  J. E. OWEN  2,446,303
WELL LOGGING APPARATUS
Filed Nov. 27, 1943
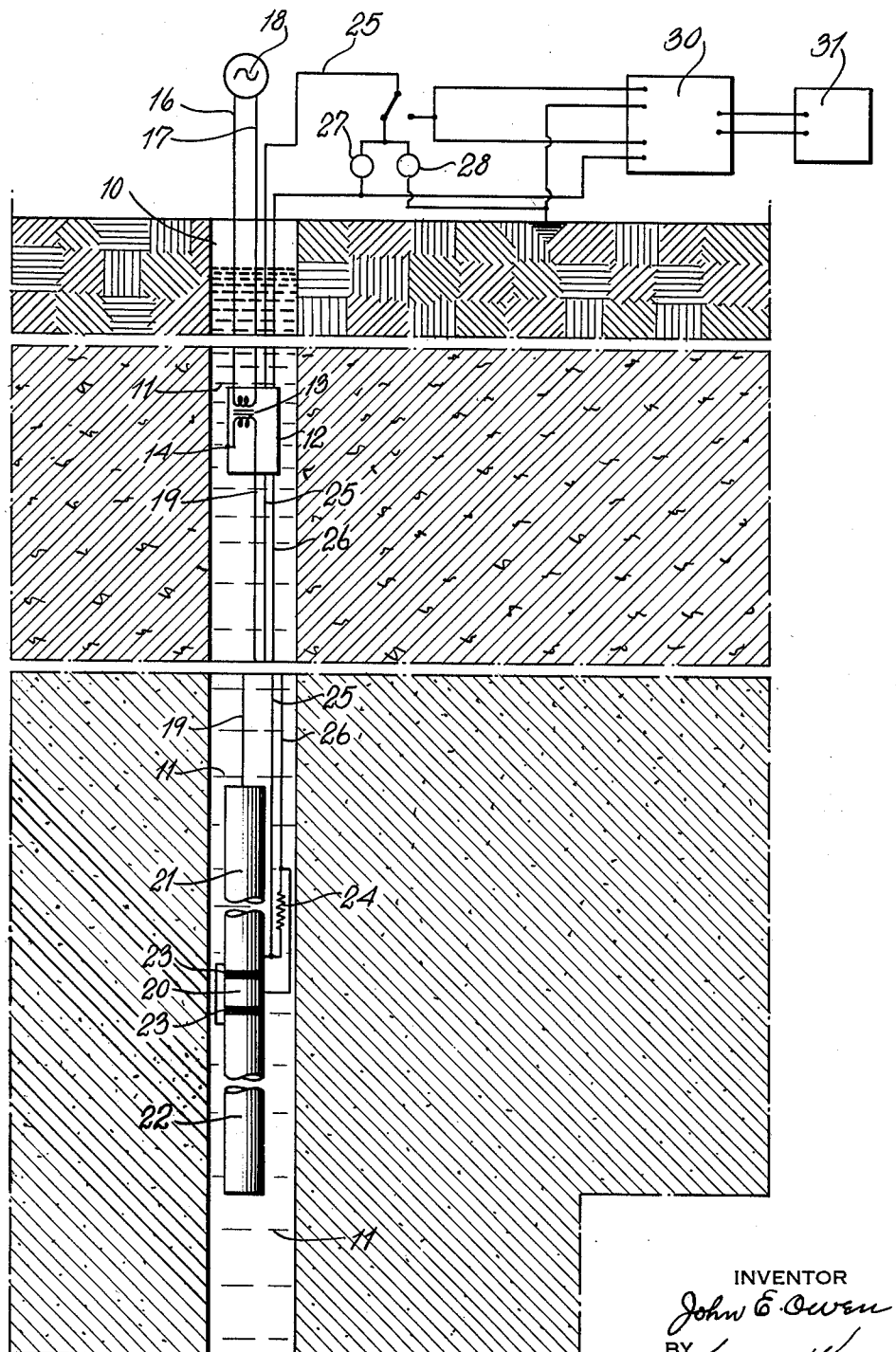
INVENTOR
John E. Owen
BY Kenyon & Kenyon
ATTORNEYS Patented Aug. 3, 1948

2,446,303

UNITED STATES PATENT OFFICE 2,446,303

WELL LOGGING APPARATUS

John E. Owen, Tulsa, Okla., assignor to Geophysical Research Corporation, New York, N. Y., a corporation of New Jersey Application November 27, 1943, Serial No. 511,943

6 Claims. (Cl. 175—182)

1

This invention relates to improvements in methods of and apparatus for making a resistance measurement of sub-surface materials traversed by bore holes.

One method of determining the nature of sub-surface materials traversed by a bore hole comprises lowering a single electrode at the end of an insulated electrical cable and making measurements of the resistance between the electrode in the bore hole and a second electrode embedded in the earth's surface convenient to the mouth of the bore hole. Changes in the resistance between the two electrodes are significant in that they are an aid in the study of the nature of the materials immediately surrounding the suspended electrode. An exploring system of the general character referred to is described in Karcher Patent No. 1,927,664, entitled Method and apparatus for exploring bore holes. In the Karcher system, the drilling bit is electrically insulated from the drill stem and is electrically connected to measurement equipment at the top of the hole. The resistance measurements for the hole are thus obtained as the hole is drilled.

In order that a resistance measuring system of the type above referred to shall be satisfactory, it is essential that it respond to relatively thin strata and shall show a sudden change in resistance as the electrode passes an interface between two strata of different electrical characteristics. Since the current spreads out in all three dimensions from the suspended electrode, the major part of the resistance measured is that encountered in the immediate neighborhood of the electrode. The resistance of the measuring equipment and the ground electrode may be appreciable, but remains constant. A change in resistance between the suspended electrode and the ground electrode indicates a change of resistance immediately adjacent the suspended electrode and so is significant of a change in the material in the immediate neighborhood of the suspended electrode. As it is desirable that the measured resistance be affected by a thin stratum, it has been the practice to make the electrode quite short in length. However, there is a limit beyond which it is not practical to decrease the length of the electrode and with the shortest possible electrode, it is not possible to limit the resistance change to the effect of a narrow stratum only. This is due to the tendency of the current to flow in all directions from the electrode. The effect is particularly troublesome if the specific resistivity of the fluid in the bore hole is lower than that of the strata opposite the electrode.

An object of this invention is to provide an electrode arrangement and method of operating the same which causes the current flowing from the exploring electrode to be concentrated into a narrow section of the material surrounding the bore hole.

According to this invention, the flow of current from the exploring electrode is limited to a narrow field through the use of auxiliary current directing electrodes and associated apparatus by which the current from the exploring electrode is caused to flow in a thin practically horizontal sheet. Since the current flow is the means by which the resistance measurements are made, and since (due to the geometry of current flow from a single electrode in a bore hole) the major portion of the resistance changes encountered in a survey of a bore hole is characteristic of the sub-surface material in the immediate neighborhood of the bore hole, it follows that this modification is one having inherent advantages over the single electrode arrangement previously used. By the practice of the present invention very thin strata can be located from electrical measurements made in the hole without the expensive process of coring.

A device embodying the invention suitable for use in comparatively shallow bore holes is disclosed and claimed in my copending application, Ser. No. 347,682, filed July 26, 1940 but now abandoned. Such a device includes cables by which direct current is carried from the earth's surface through the bore hole to the main and auxiliary electrodes and for large depths the cables have to be of prohibitive diameter in order to be of sufficiently low resistance to insure proper voltage relation between the main and auxiliary electrodes.

A further object of this invention is a device embodying the invention and capable of satisfactory operation at substantially any depth of bore hole.

Other objects, novel features and advantages of this invention will become apparent from the following specification and accompanying drawings, wherein the single figure illustrates a device embodying the invention.

In the drawing, 10 designates a bore hole in the earth passing through strata having different characteristics including different specific electrical resistivities. The hole 10 is shown as being nearly filled with a fluid 11 such, for example, as drilling mud as is usually the case with bore holes.

A metallic container 12 is supported in the bore hole 10 by any suitable means, not shown, for movement vertically in the hole. Within the container 12 is mounted a transformer 13, the secondary of which has one terminal attached to the container at 14. The primary of the transformer 13 is connected by suitable insulated conductors 16 and 17 to a source 18 of alternating current located on the earth's surface.

An electrode assembly is supported from the container 12 by an insulated conductor 19, the upper end of which is electrically connected to the remaining terminal of the secondary of the transformer 13. The electrode assembly consists of an exploring electrode 20 and two auxiliary or guard electrodes 21 and 22 insulated from the electrode 20. The electrode 21 is arranged above the electrode 20 and the electrode 22 is arranged below it. The three electrodes are of generally cylindrical shape and the electrode 20 is only a fraction of the length of each of the other electrodes. The insulation between the exploring electrode and each of the two auxiliary electrodes is in the nature of a disk 23 interposed between the adjacent ends of the electrodes.

The upper auxiliary electrode 21 is electrically connected to the lower end of the cable 19 and the lower auxiliary electrode 22 is electrically connected to the upper auxiliary electrode 21. The upper auxiliary electrode 21 is electrically connected to the exploring electrode 20 through a resistor 24 of from .03 to .05 ohm. The terminals of the resistor 24 are electrically connected through insulated conductors 25 and 26 to the terminals of a voltmeter 27 which, in conjunction with the resistor 24, constitutes an ammeter. The conductor 25 is also connected to one terminal of a voltmeter 28, the remaining terminal of which is grounded by an electrode at 29. The resistance of 24 is sufficiently small that the potential difference between the electrodes 21 and 20 is insignificant with respect to the logging of a well.

Alternating current is supplied from the source 18 to the primary of the transformer 13 which is of the step-down type and the secondary of which is grounded through the wall of the container 12. Current is supplied from the secondary of the transformer 13 through the conductor 19 to the electrode 21. Current flows from the electrode 21 through the resistor 24 to the electrode 20 from which current passes through the drill mud into the surrounding earth and returns to the grounded terminal of the voltmeter 28. By reason of the small value of the resistor 24, the electrode 20 is at substantially the same potential as the electrodes 21 and 22. By virtue of this potential relationship and the geometric arrangement of the three electrodes, the path of current flow from the electrode 20 is confined for a considerable distance into the earth to a horizontal plane in which the current flows in all directions from the electrode 20.

The meter 28 registers the voltage between the auxiliary electrode 21 and ground while the meter 27 registers the current flowing through the electrode 20. The ratio of the two readings is proportional to the specific resistivity of the earth directly opposite the exploring electrode 20. A change in the value of the resistivity in the bore hole at different depths indicates a change in the nature of the materials immediately surrounding the electrode 20. As a result of the current flow from the electrode 20 being in a narrow substantially horizontal path, it penetrates a considerable distance into the surrounding earth's surface so that a true indication of the nature of the stratum is obtained.

The conductor 19 is sufficiently long that the electrical field at the point of ground will not interfere with the field produced by the electrodes 21 and 22. It is, however, sufficiently short that with a comparatively small diameter it has sufficiently low resistance not to affect the operation of the exploring and ground electrodes.

The voltages across the two meters 27 and 28 may be impressed upon the terminals of a voltage ratio amplifier 30 of the type disclosed and claimed in the copending application of Alfred Wolf, Serial No. 504,397, filed September 30, 1943, now Patent No. 2,400,326, having associated therewith a registering instrument 31. The instrument 31, as fully explained in said application registers a measure of the ratio of two alternating current voltages supplied to the amplifier 30. So long as the current flow through the exploring electrode 20 remains constant, the voltage drop across the resistor 24 remains constant and the instrument 31 remains unchanged in view of the fact that the voltage drop between the electrode 20 and ground remains constant. However, when there is a change in the resistivity in the earth surrounding the bore hole, the current flowing from the electrode 20 varies and effects a variation in the potential drop across the resistor 24. The reading of the instrument 31 thereupon changes and indicates a change in the nature of the material surrounding the exploring electrode 20.

Switches are provided by means of which the amplifier 30 may be utilized or not, as desired. When the amplifier is not used, the resistivity at any given depth is computed from the readings of the two meters 27 and 28.

It is to be understood that the drawing is intended as a representation of a bore hole extending several hundreds or even thousands of feet into the earth and that the illustration of the apparatus elements of the invention is entirely schematic. In an electrode assembly heretofore used embodying the invention, the electrodes 21 and 22 are metal cylindrical members of 10 feet in length and 3 inches in diameter while the electrode 20 is of 2 inches in length and of the same diameter as the other electrodes. The container 12 is of any suitable construction which will enclose and protect the transformer 13 and at the same time serve as means from which to suspend the electrode assembly. It must be made of metal since it acts as a ground and should be sufficiently long so that its contact resistance to the earth is very low.

It is of course understood that various modifications may be made in the apparatus above described without in any way departing from the spirit of the invention as defined in the appended claims.

This application is a continuation-in-part of Owen application, Serial No. 347,682 filed July 26, 1940.

I claim:

1. Apparatus for electrically logging a bore hole comprising a main electrode suspended in the bore hole, one or more auxiliary electrodes in fixed vertically spaced relation to and insulated from said main electrode, a transformer movable with said electrodes and having its primary connected to an alternating current source at the earth's surface, means grounding one terminal of the transformer secondary at a point removed from said electrodes, means connecting the remaining secondary terminal both to the main and auxiliary electrodes, means for measuring the current flow through the main electrode, and means for measuring the voltage between the main electrode and a distant point in the earth.

2. Apparatus for electrically logging a bore hole comprising a main electrode suspended in the bore hole, one or more auxiliary electrodes in fixed vertically spaced relation to and insulated from said main electrode, a transformer movable with said electrodes and having its primary connected to an alternating current source at the earth's surface, means grounding one terminal of the transformer secondary at a point removed from said electrodes, means connecting the remaining secondary terminal both to the main and auxiliary electrodes, means including a low value resistor in the connection between the transformer secondary and the main electrode for measuring the current flow through the main electrode, and means for measuring the voltage between the main electrode and a distant point in the earth.

3. Apparatus for electrically logging a bore hole comprising an elongated electrode having two vertically spaced sections, an exploring electrode intermediate the sections of the elongated electrode and in fixed vertically spaced relation thereto, a grounded electrode, means for simultaneously setting up approximately equal potential drops between the first two electrodes and the grounded electrode, means for simultaneously moving said electrodes in said fixed spaced relation along the bore hole and means for simultaneously measuring the electric current flowing between the exploring electrode and the grounded electrode.

4. Apparatus for electrically logging a bore hole comprising an electrode assembly consisting of a cylindrical exploring electrode and an alined cylindrical auxiliary electrode in fixed vertically spaced relation to each end of said exploring electrode, said three electrodes being of the same cross-section and the exploring electrode being less than half the length of an auxiliary electrode, means for moving the electrode assembly along the bore hole, a grounded electrode, means for simultaneously setting up approximately equal potential drops between the electrodes of the electrode assembly and the grounded electrode, and means for simultaneously measuring the electrical current flow between the exploring electrode and the grounded electrode.

5. Apparatus for electrically logging a bore hole formed in the earth and containing electrically conductive fluid, said apparatus including an electrode assembly adapted to be lowered into the bore hole during its logging, said assembly comprising an exploring electrode having elongated guard electrodes positioned both above and below it and with said guard electrodes having an electrical interconnection and at least one of said guard electrodes having an electrical connection through an electrical impedance with said exploring electrode and with all said electrodes adapted for simultaneous movement thereof when said assembly is lowered into the bore hole and moved therein during its logging, and, in combination with said assembly, an electric current supplier and two electric conductors in electrical connection with said supplier for energization thereby and with one of said conductors adapted to be electrically grounded with the earth entirely remotely from said assembly and the other of said conductors having an electrical connection with at least one of said guard electrodes of said assembly and being otherwise electrically insulated from the earth, whereby to electrically energize all of said electrodes and the earth during the bore hole logging, an electric potential measuring instrument adapted for use at the earth's surface, and two electric conductors for connection with said instrument so the latter measures electrical potential differences therebetween and which are long enough to reach from said instrument, while it is at the earth's surface, to said assembly in the bore hole during the latter's logging and having an electrical connection with said impedance for electrical energization of said instrument's conductors by said impedance and with said instrument's conductors otherwise electrically insulated from the earth, whereby to measure the electric current flowing through said exploring electrode to the earth during logging of the bore hole, the electrical impedance of said impedance being sufficiently small so that the potential difference between said electrodes of said assembly is insignificant with respect to logging the bore hole and said guard electrodes being otherwise insulated from said exploring electrode, whereby to cause current flow through said impedance as required to energize said second-named conductors to permit said measure of the current flowing through said exploring electrode to the earth.

6. An apparatus as defined by claim 5 with said current supplier comprising a transformer carried in a container protecting it from the fluid in the bore hole and with said container adapted to be lowered into the bore hole during its logging, the primary of said transformer being provided with insulated powering conductors of sufficient lengths to reach to the earth's surface when said container is lowered into the bore hole and thus permitting said transformer to be located closer than the earth's surface to said electrode assembly and to be moved therewith during the bore hole logging, and the secondary of said transformer connecting at one end with the one of the first-named conductors in said claim that is grounded and with this conductor being grounded by connecting with an electrode surface mechanically connected with and moving with said container and with said electrode surface exposed to the bore hole's fluid, and with the other end of said secondary connected with the other one of said first-named conductors, and with at least one of said first-named conductors being adapted to permit said electrode surface to be positioned in the bore hole far enough from said assembly and electrically isolated therefrom so the electrical field of said electrode surface will not interfere with the electrical fields of said electrode assembly, during the well logging, but with said electrode surface closer than the earth's surface to said assembly.

JOHN E. OWEN.

REFERENCES CITED

The following references are of record in the file of this patent:

UNITED STATES PATENTS

| Number | Name | Date |
| --- | --- | --- |
| 1,537,919 | Elliott | May 12, 1925 |
| 1,826,961 | Slichter | Oct. 13, 1931 |
| 2,172,557 | Evjen | Sept. 10, 1939 |
| 2,172,778 | Taylor | Sept. 12, 1939 |
| 2,183,565 | Hawley | Dec. 19, 1939 |
| 2,192,404 | Jakosky | Mar. 5, 1940 |
| 2,206,891 | Hawley | July 9, 1940 |
| 2,206,894 | Silverman | July 9, 1940 |
| 2,221,951 | Mounce | Nov. 19, 1940 |
| 2,248,982 | Gillbergh | July 15, 1941 |
| 2,266,071 | Piety | Dec. 16, 1941 |
| 2,347,794 | Piety | May 2, 1944 |
| 2,376,168 | Mounce | May 15, 1945 |